United States Patent

[11] 3,630,075

[72] Inventor Fred K. Rose
 Chula Vista, Calif.
[21] Appl. No. 29,968
[22] Filed Apr. 20, 1970
[45] Patented Dec. 28, 1971
[73] Assignee The United States of America as represented by the Secretary of the Air Force

[54] DOUBLE BEAM EXTENSOMETER
 6 Claims, 5 Drawing Figs.
[52] U.S. Cl. .................................................. 73/95,
 73/89, 33/147 D, 33/148 D, 33/148 H
[51] Int. Cl. .................................................. G01n 3/08,
 G01b 5/00
[50] Field of Search .................................... 73/95, 103,
 89; 33/147 D, 148 D, 125 R

[56] References Cited
UNITED STATES PATENTS
2,910,778 11/1959 Strimel .................. 33/148 D
3,295,365 1/1967 Larrigan et al. .......... 33/147 D

*Primary Examiner*—Richard C. Queisser
*Assistant Examiner*—Marvin Smollar
*Attorneys*—Harry A. Herbert, Jr. and Arsen Tashjian ABSTRACT: A double beam extensometer, for use in a tensile- or creep-testing machine, particularly well suited for accurately and directly measuring the gauge length strain of thin material specimen, including composites and filaments as thin as 0.001 inch to a temperature of 5,000° F. in a high vacuum. The extensometer includes a brass lower body that contains two linear variable differential transformer windings, a copper upper body to which is affixed a closed end austenitic stainless-steel tube which extends downwardly through the linear variable differential transformer windings, a copper beam support bracket that clamps to the upper body, and cores, core suspensions, beams, extension strips, and associated conventional components, such as power supply, control panel with oscillator-demodulator and recorder readout. As the specimen is strained by the applied load, the beams are displaced and cause differential movement of the cores in the linear variable differential transformers and, therefore, difference in voltage as to each linear variable differential transformer. The difference in voltage is then read directly as the gauge length strain undergone by the specimen.

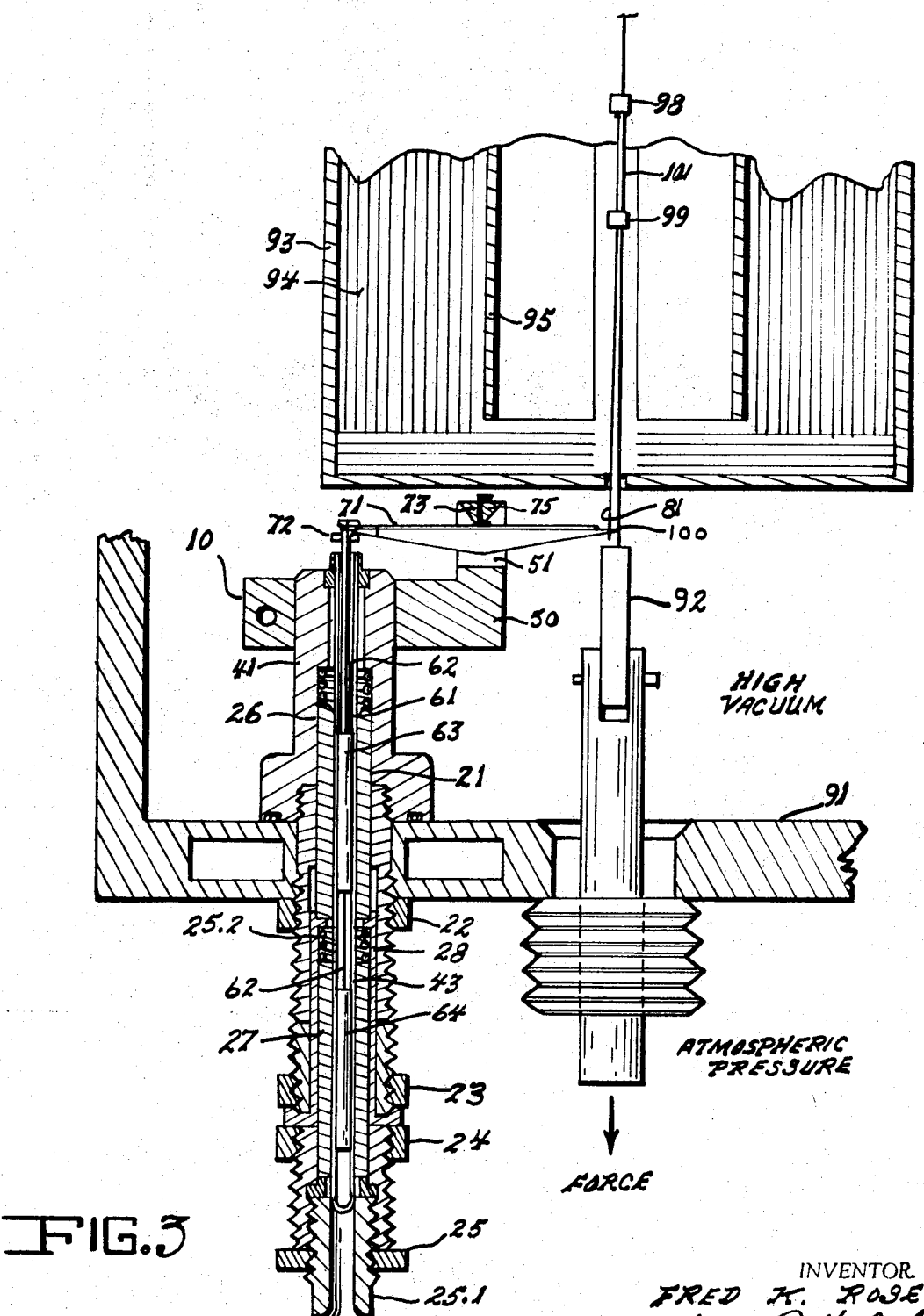

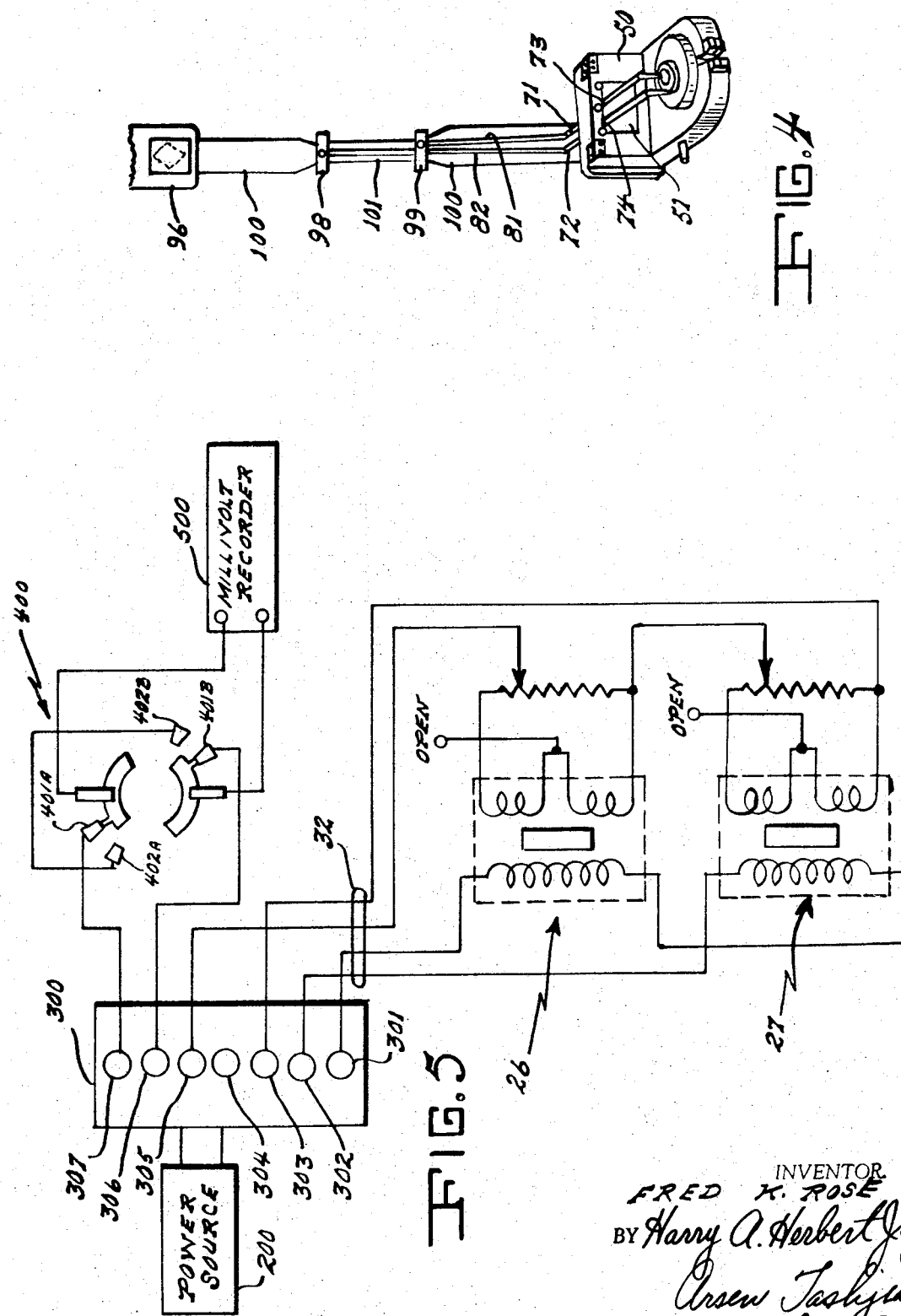

DOUBLE BEAM EXTENSOMETER

BACKGROUND OF THE INVENTION

This invention relates to a double beam extensometer for use in a tensile-or creep-testing machine. The extensometer is particularly well suited for accurately measuring directly the gauge length strain of thin materials, including composites and filaments, as thin as 0.001 inch to a temperature of 5,000° F., in a high vacuum.

Although the invention is adaptable for use in any tensile or creep testing machine, in the interest of simplicity and brevity the invention will be discussed as adapted for use in a tensile testing machine of the screw-driven type fitted with two vacuum chambers, an upper and a lower, and having a resistance furnace in the lower vacuum chamber and a load cell in the upper vacuum chamber. The tensile-testing machine has an upper and a lower force applying member and an upper load-measuring member. It is emphasized that this adaptation of the invention is by way of illustration only, and is not by way of limitation.

Because of the problems associated with the direct measurement of gauge length strain, particularly under adverse conditions of temperature when testing a fragile or chemically reactive specimen, indirect methods of determining the strain have been and are being frequently used. Usually, the total specimen elongation is measured and the effective gauge length is calculated by correction errors.

The term "effective gauge length," as heretofore and hereafter used, is intended to mean the ratio of the total measured elongation to the corresponding uniform elongation that occurred within the specimen gauge length.

It has been found that the effective gauge length changes as a given specimen is deformed. Within the elastic range the effective gauge length is large because the reduced section, fillets and shoulders each elongate in proportion to the reciprocal of their respective cross-sectional areas. When yielding of the gauge section begins, the loading rate and additional elastic elongation of the fillets and shoulders sharply decrease, causing the effective gauge length to become more nearly equal to the actual gauge length. With increased plastic strain, strain-hardening causes increased strength in the gauge section, which results in greater amounts of deformation in the regions external to the gauge length, thus again increasing the effective gauge length. There is no good, indirect method for the precise determination of effective gauge length, since factors, such as specimen geometry, the extent of straining and the strain-hardening sensitivity (which are, in turn, affected by composition and temperature) must be considered.

For the accurate determination of elastic modulus, proportional limit, the yield strength to a particular offset, or the true stress-strain relationships of a material, it is necessary to measure gauge length elongation during the progress of a test. Gauge length strain is typically the most difficult property to measure during tensile tests, and the problems are compounded when either the test temperature is extreme or the material being tested is very thin.

Extensometers, for use in a tensile-or creep-testing machine, currently being used on thin gauge materials can be categorized as either optical or mechanical (including electromechanical), according to the method used for coupling to the specimen. Both types have certain significant disadvantages. For example, optical extensometers usually require visual access to the gauge section and high-contrast gauge length marker tabs, both of which are difficult to provide at elevated temperatures without disrupting the thermal profile of the furnace of the testing machine. Further, mechanical (or electromechanical) extensometers require the application of a force that deflects a strain gauged beam or moves the elements of a displacement transducer, such as a linear variable differential transformer (hereinafter referred to as LVDT) or a linear potentiometer. These actuating forces are derived from the specimen and are normally of such magnitude as to adversely affect the tensile properties of a thin specimen (i.e., as thin as 0.001 inch), particularly at elevated temperatures.

This invention significantly advances the state of the art by permitting the accurate and direct measurement of gauge length strain in thin materials, including composites and filaments, at elevated temperatures as high as 5,000° F. in a high vacuum, thereby overcoming and obviating shortcomings and disadvantages of prior art devices.

SUMMARY OF THE INVENTION

This invention relates to a double beam extensometer, for use in a tensile-or creep-testing machine, which is particularly well suited for accurately measuring the gauge length strain of thin materials, in a high vacuum, to a high temperature.

An object of this invention is to provide apparatus for measuring the gauge length strain of materials, including composites and filaments, as thin as 0.001 inch, in a high vacuum.

Another object of this invention is to permit such testing with an accuracy of measurement of the gauge length strain of approximately 50 microinches/inch and yet be used to the fracture of foil gauge specimen.

Still another object of this invention is to allow such accurate measurement to be accomplished directly.

A further object is to permit the thin gauge materials to be tested at temperatures as high as 5,000° F.

These objects, and still other and related ones of this invention will become readily apparent after a consideration of the description of the invention and reference to the drawings.

DESCRIPTION OF THE DRAWINGS

FIG. 3 is a side elevation view, partly in schematic form and partly in cross section, showing a portion of the preferred embodiment and of a specimen positioned for testing;

FIG. 4 is a front view, partly in perspective, of a portion of the preferred embodiment, showing a specimen positioned for testing; and FIG. 5 is a schematic representation of a preferred circuit, and associated components, to operate the preferred embodiment of the invention.

DESCRIPTION OF THE PREFERRED EMBODIMENT

Figure 1:
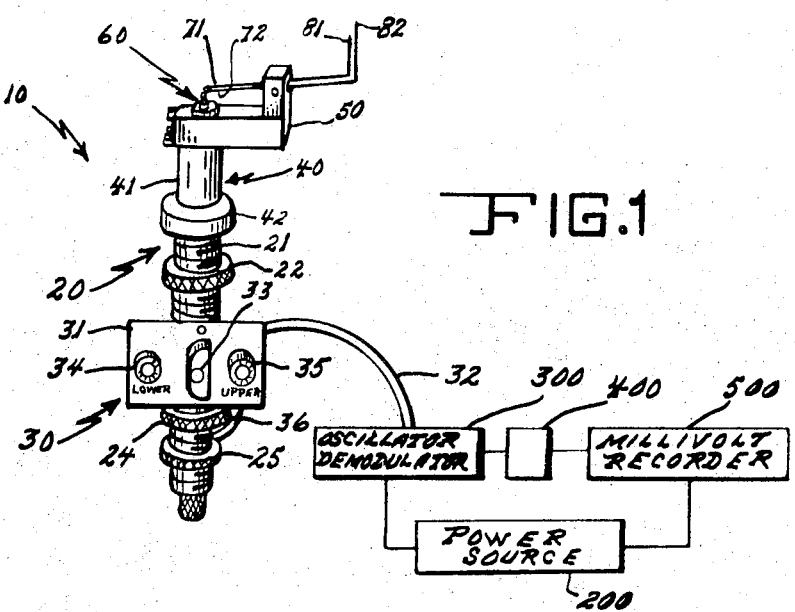
FIG. 1 is a side elevation view of the exterior of a preferred embodiment of the invention.

As to FIGS. 1 through 5, in all figures, the same reference character denotes the same component.

As to FIG. 1, therein is shown, in side elevation, the exterior of the preferred embodiment 10, prior to installation in the tensile-testing machine. The components include: lower body subassembly 20 with externally threaded lower body 21 which preferably is of brass and is configurated in the form of a cylinder with a knurled lock nut 22 and a plurality of knurled adjustment nuts, such as 24 and 25 thereon; top portion of upper body subassembly 40 with upper body 41, preferably of copper and having a flanged base 42, with a groove for an O-ring seal, fitted upon the top portion of lower body 21; beam support bracket 50 fitted over, and clamped to, the top portion of upper body 41; extensometer beams 71 and 72, preferably of molybdenum, attached at one end to the upper portion of core suspension subassembly 60, and attached at the other end, respectively, to extension strips 81 and 82, preferably of the same material as the specimen to be tested.

Also shown is control panel subassembly 30 which includes: control panel 31 affixed to lower body 21 and connected to power source 200 by multiwire electrical cable 32; socket 33, preferably of the 24-pin type, and potentiometers 34 and 35, preferably of the 10-turn type, on control panel 31 in suitable electrical connection with the oscillator-demodulator 300 and power source 200 through cable 32; and multiwire leads, such as 36, from control panel 31 to the interior of lower body 21 and making electrical connection with a first or upper LVDT (not shown) and a second or lower LVDT (not shown). Also shown are convenience switch 400 and multivolt recorder 500.

It is here to be noted that the term "body" as heretofore and hereinafter used is intended to be synonymous with and interchangeable with the term "housing."

Figure 2:
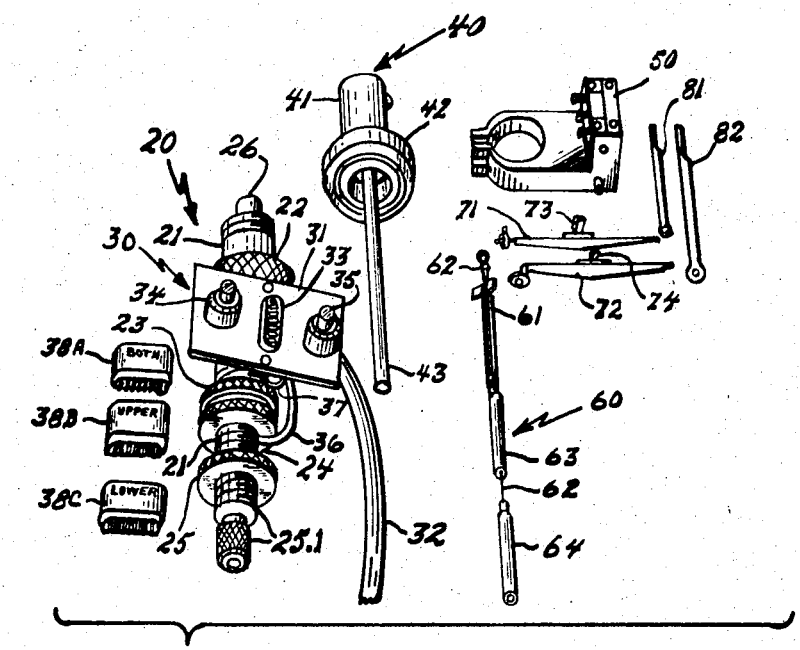
FIG. 2 is a plan view of the preferred embodiment of the invention, disassembled to show some major components thereof.

As to FIG. 2, with reference to this figure, therein are shown: lower body subassembly 20 with externally threaded lower body 21 slotted diametrically along its lower half with knurled adjustment nuts 22, 23, 24 and 25; control panel subassembly with socket 33, potentiometers 34 and 35, patch plugs 38A, 38B and 38C that provide electrical connection, respectively, to the upper 26, the lower, or both LVDTs; multiwire electrical cable 32 with multiwire leads 36 and 37; upper body subassembly 40 with upper body 41, flange base 42, and tube 43, preferably of stainless steel, which is closed at its lower end and brazed joined at its upper end to upper body 41; beam support bracket 50; core suspension subassembly 60 including knife-edge and open-ended tube suspension 61, knife-edge and wire suspension 62, upper cylindrical open-end LVDT core 63, and lower cylindrical LVDT core 64; extensometer beams 71 and 72 with foil pivots 73 and 74; and extension strips 81 and 82.

As to FIG. 3, therein is shown, in cross section, the preferred embodiment 10, the extensometer, as positioned in the tensile testing machine. The components of embodiment 10 shown include: hollow upper body or housing 41 with flange base 42 and tube 43 closed at the lower end; hollow lower body or housing 21 fitted over tube 43 and removably attached to the lower portion of upper body 41; support bracket 50 attached, preferably clamped, to the outer periphery of the upper portion of upper body 41, and having a transversely positioned aperture or hole 51; parallel beams 71 and 72 pivotally balanced at a common fulcrum 75 on foil pivots 73 and foil pivot 74 (not shown) of beam 72; suspension strips 81 and 82 attached to, respectively, the ends of beams 71 and 72 and extending upwardly therefrom; open-ended extension tube 61 attached to the other end of beam 71 and extending downwardly into upper body 41, tube 43, and lower body 21; first linear variable differential transformer 26 with hollow core 63, positioned within hollow lower body 21, and with core 63 attached to the other end, i.e., the lower end of extension tube 61; suspension wire 62 attached to the other end of beam 72 and extending downwardly into upper body 41, into lower body 21, and through hollow core 63 of first LVDT 26; second linear variable differential transformer 27 positioned below first LVDT 26 and axially aligned with it, and having open-ended core 64 which is attached to suspension wire 62; and knurled adjustment nuts 22, 23, 24 and 25.

The lower end of the upper LVDT 26 is bonded to the upper end of cylindrical body 28. Rotation of the knurled nuts 23 and 24, which bear against two diametrically opposed projections of cylindrical body 28 provides the means for vertical positioning of the upper LVDT 26. Similarly, the lower LVDT 27 is adjusted vertically by means of screw 25.1 and spring 25.2; knurled nut 25 locks this adjustment.

Shown in FIG. 3 are: The base plate 91 of the high-vacuum chamber of the tensile machine, with penetrate mounting of the preferred embodiment 10 and for the bellows-sealed lower force applying number 92; a split water-cooled copper cold wall 93 containing refractory metal shielding 94 and heating element 95 comprising high-temperature tensile-testing furnace; a test specimen 100 extending vertically through the furnace with refractory metal clamps affixed at each end at the gauge section 101 of specimen 100; suspension strip 81 extending from tip of beam 71 to lower gauge marker clamp 99 and; suspension strip 82 (not shown) extending from tip of beam 72 (not shown) to upper gauge marker clamp 98.

As to FIG. 4, therein are shown: beam support bracket 50 with aperture 51; beams 71 and 72; extension strips 81 and 82 attached at one end, respectively, to beams 71 and 72, and attached at the other end to gauge section 101 of specimen 100 by clamps 98 and 99; and upper force applying member 96 to which is attached upper part of specimen 100.

As to FIG. 5, it is depicted, in simplified schematic form, a preferred electrical circuit, including associated components, for operating the preferred embodiment. More specifically, therein are shown: AC source 200, oscillator-demodulator 300, convenience switch 400 with contacts 401A, 401B, 402A and 402B, millivolt recorder 500, and first or upper LVDT 26 and second or lower LVDT 27. In practice, oscillator-demodulator 300, convenience switch 400, and millivolt recorder 500 are positioned at a control console at the opposite end of multiwire electrical cable 32. Additionally, the view shown is of the circuit which is formed when the "Both" patch plot 38A, FIG. 2, is installed, connecting both LVDTs 26 and 27 for normal operation.

The "upper" patch plug 38B and the "lower" patch plug 38C are used to connect respectively either the upper LVDT 26 or lower LVDT 27 to the oscillator-demodulator circuit for calibration purposes. Contact points 301 and 302 are for the primary coils or windings of LVDTs 26 and 27; contact points 303 and 305 are for the secondary coils or winding of LVDTs 26 and 27; contact point 304 is for the center tap; and contact points 306 and 307 are for millivolt recorder 500 with the input being cut off if the convenience switch 400 is in the 402A–402B position.

MODE OF OPERATION OF THE PREFERRED EMBODIMENT

In essence, the embodiment operates substantially as follows: after the thin gauge specimen 100, FIGS. 3 and 4 is attached to extension strip 82, FIGS. 1, 3, 4 and extension strip 81, FIGS. 1–4, at the upper and lower portion of gauge section 101, FIGS. 3 and 4, specimen 100, FIG. 4, is strained by an axial load applied through force applying member 92 and 96, FIG. 4. As a result, extension strips 81 and 82, FIGS. 1, 3, 4 are displaced and, in turn, deflect, respectively, beams 71 and 72, FIGS. 1, 3, 4 with each beam following the movement of its respective strip. The movement of the beams 71 and 72, FIGS. 1–4, causes a corresponding differential movement of LVDT cores 63 and 64, FIGS. 2 and 3. The movement of strips 81 and 82, FIGS. 1–4, beams 71 and 72, FIGS. 1–4, and LVDT cores 63 and 64, FIGS. 2 and 3, is proportional to the elongation of specimen gauge section 101, FIG. 4. The output signals from the LVDTs 26 and 27, FIG. 3, as a result of the displacement of cores 63 and 64, FIGS. 2 and 3, are summed to produce a net signal which is proportional to the elongation of gauge section 101, FIG. 4. A continuous record of strain, to the point of fracture of the specimen is, or may be, recorded by the millivolt recorder 500. FIG. 5.

The embodiment is calibrated in-situ by means of a micrometer calibrator (not shown) which is attached for the purpose to beam suspension bracket 50, FIGS. 2, 3 and 4. Short suspension strips transmit the rectilinear motion of a nonrotating micrometer spindle to the tips of beams 71 and 72, FIGS. 1–4, respectively. With the "Lower" patch plug 38C, FIG. 2, inserted in the socket 33, FIGS. 1 and 2, potentiometer control 34, FIGS. 1 and 2, is adjusted to give the desired output signal to millivolt recorder 500, FIGS. 2 and 5, for a given displacement of the micrometer spindle. Typical out signals are 10 millivolts per 0.001 inch of displacement over a total displacement of 0.1 inch. The "Both" patch plug 38C, FIG. 2, is then inserted into socket 33, FIGS. 1 and 2, and the potentiometer control 35, FIGS. 1 and 2, is adjusted to produce minimum tracking error when both beams 71 and 72, FIGS. 1–4, are displaced equal amounts. The typical tracking error is about one part in 1,000 over a total displacement of 0.1 inch.

While there has been shown and described the fundamental features of my invention, as applied to a preferred embodiment, it is to be understood that various substitutions and omissions may be made by those skilled in the art without departing from the spirit of the invention.

What I claim is:

1. A double beam extensometer for use in a tensile-testing machine having an upper and lower force applying member, and with a specimen to be tested held by and between the force applying members, comprising:

a. a hollow upper body having an upper and a lower portion;
b. a tube, closed at the lower end and open at the upper end, attached at the upper end to the lower portion of said hollow upper body;
c. A hollow lower body fitted over said tube and removably attached to the lower portion of said hollow upper body;
d. a support bracket attached to the outer periphery of the upper portion of said hollow upper body and extending outwardly therefrom;
e. two parallel beams pivotally balanced on a common fulcrum attached to the bracket so that the beams are parallel to the bracket when physically balanced, and each of said beams having at one end a suspension strip, one longer than the other, attached thereto and extending upwardly for attachment to opposite ends of the specimen to be tested, with the upper and lower force applying members of the tensile-testing machine disposed respectively above and below said suspension strips and holding said specimen;
f. an open-ended extension tube attached to the other end of one of said beams and extending downwardly into said hollow upper body, and into said tube attached to said upper body;
g. a first linear variable differential transformer, having a hollow core and windings, positioned within said hollow lower body, with said core attached to the other end of said open-ended extension tube;
h. a suspension wire attached to the other end of the other of said beams and extending downwardly into said hollow upper body, into said hollow lower body, and through the hollow core of said first linear variable differential transformer;
i. a second linear variable differential transformer, having an open-ended core and windings, positioned within said hollow lower body at a location below said first linear variable differential transformer and axially aligned therewith, with said open-ended core attached to said suspension wire;
j. means for energizing said first and said second linear variable differential transformers;

whereby with the application of the stress load to, and resultant strain of, the specimen, the said beams pivot at the common fulcrum, thereby causing differential displacement of the said cores of the said first and second differential transformers and resulting in voltage which is proportional to gage length elongation and which may be measured.

2. The double beam extensometer, as set forth in claim 1, wherein said hollow upper body is of brass.

3. The double beam extensometer, as set forth in claim 1, wherein said hollow lower body is of copper.

4. The double beam extensometer, as set forth in claim 1, wherein said tube attached at the upper end to the lower portion of said hollow upper body is of stainless steel.

5. The double beam extensometer, as set forth in claim 1, wherein said pivotally balanced beams are of molybdenium.

6. The double beam extensometer, as set forth in claim 1, wherein said extension strips attached to said pivotally balanced beams are of the same material as the specimen to be tested.

* * * * *